(12) United States Patent
Zhang et al.

(10) Patent No.: US 11,637,431 B2
(45) Date of Patent: Apr. 25, 2023

(54) INVERTER

(71) Applicant: Huawei Digital Power Technologies Co., Ltd., Shenzhen (CN)

(72) Inventors: Yanzhong Zhang, Shanghai (CN); Xun Wang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/360,245

(22) Filed: Jun. 28, 2021

(65) Prior Publication Data

US 2021/0328435 A1 Oct. 21, 2021

Related U.S. Application Data

(63) Continuation of application No. PCT/CN2018/125347, filed on Dec. 29, 2018.

(51) Int. Cl.
  *H02J 3/38* (2006.01)
  *H02M 7/48* (2007.01)
  *H02M 3/156* (2006.01)

(52) U.S. Cl.
  CPC ............ *H02J 3/381* (2013.01); *H02M 3/156* (2013.01); *H02M 7/48* (2013.01); *H02J 2300/24* (2020.01)

(58) Field of Classification Search
  CPC ...... H02J 3/381; H02J 2300/24; H02M 3/156; H02M 7/48; H02M 7/5387; H02M 1/007; H02M 1/0074; H02M 3/1584; Y02E 10/56
  See application file for complete search history.

(56) References Cited

U.S. PATENT DOCUMENTS

| | | |
|---|---|---|
| 2011/0144822 A1 | 6/2011 | Choi |
| 2014/0001864 A1 | 1/2014 | Nirantare et al. |
| 2014/0117769 A1 | 5/2014 | Potharaju et al. |
| 2017/0317523 A1 | 11/2017 | Adest et al. |
| 2018/0269691 A1 | 9/2018 | Garrity |
| 2018/0287389 A1 | 10/2018 | Yu et al. |

FOREIGN PATENT DOCUMENTS

| | | |
|---|---|---|
| CN | 1700573 A | 11/2005 |
| CN | 201467514 U | 5/2010 |
| CN | 101904073 A | 12/2010 |

(Continued)

*Primary Examiner* — Toan T Vu
(74) *Attorney, Agent, or Firm* — Womble Bond Dickinson (US) LLP

(57) ABSTRACT

An inverter includes a direct-current conversion unit, a busbar unit, and an inversion unit. The direct-current conversion unit includes a first positive input terminal, a first negative input terminal, a second positive input terminal, a second negative input terminal, a first direct current DC-to-DC module, a second DC-to-DC module, a first on/off control device, a second on/off control device, a first switch, and a second switch. The first positive input terminal and the first negative input terminal are configured to connect a first photovoltaic string, the second positive input terminal and the second negative input terminal are configured to connect a second photovoltaic string, and a connection relationship of a circuit in the direct-current conversion unit can be changed based on combinations of turning-on or turning-off of the first switch and the second switch.

19 Claims, 16 Drawing Sheets

(56) References Cited

FOREIGN PATENT DOCUMENTS

| | | | |
|---|---|---|---|
| CN | 102165681 | A | 8/2011 |
| CN | 102437765 | A | 5/2012 |
| CN | 102611133 | A | 7/2012 |
| CN | 102738885 | A | 10/2012 |
| CN | 103166239 | A | 6/2013 |
| CN | 103269117 | A | 8/2013 |
| CN | 203352194 | U | 12/2013 |
| CN | 103872939 | A | 6/2014 |
| CN | 104218609 | A | 12/2014 |
| CN | 104333213 | A | 2/2015 |
| CN | 104506132 | A | 4/2015 |
| CN | 204886206 | U | 12/2015 |
| CN | 105245101 | A | 1/2016 |
| CN | 105493397 | A | 4/2016 |
| CN | 105676941 | A | 6/2016 |
| CN | 105743432 | A | 7/2016 |
| CN | 107230997 | | * 10/2017 |
| CN | 107230997 | A | 10/2017 |
| CN | 107425811 | A | * 12/2017 |
| CN | 107425811 | A | 12/2017 |
| CN | 108233421 | A | 6/2018 |
| CN | 108280270 | A | 7/2018 |
| CN | 207782745 | U | 8/2018 |
| CN | 108695881 | A | 10/2018 |
| CN | 108696144 | A | 10/2018 |
| CN | 109066798 | A | 12/2018 |
| DE | 102006023563 | | * 11/2007 |
| DE | 102006023563 | A1 | 11/2007 |
| EP | 3171478 | A1 | 5/2017 |
| JP | 2012065441 | A | 3/2012 |
| WO | 2014023724 | A2 | 2/2014 |

* cited by examiner

INVERTER

CROSS-REFERENCE TO RELATED APPLICATIONS

This application is a continuation of International Application No. PCT/CN2018/125347, filed on Dec. 29, 2018, the disclosure of which is hereby incorporated by reference in its entirety.

TECHNICAL FIELD

This application relates to the technical field of solar energy, and in particular, to an inverter.

BACKGROUND

In the field of solar energy, an inverter is usually used to convert direct current generated by a photovoltaic battery panel into alternating current, which is fed to the grid to implement a power generation function. Because both voltage and current that one photovoltaic battery panel can output are usually low, in order to meet working voltage and power requirements of an inverter, photovoltaic battery panels are usually connected in series and parallel to form photovoltaic strings that are connected to the inverter.

Due to possible impact from the outside, voltage output by the photovoltaic battery panel is unstable. For example, when exceptions such as aging, blocking, weak light, and short string configuration occur in the photovoltaic battery panels, power or voltage output by the photovoltaic string may be low and cannot match an optimal working mode of the inverter, resulting in low conversion efficiency of the inverter and affecting a power generation capacity.

SUMMARY

Embodiments of this application provide an inverter, which can adjust a use status of a DC/DC module based on turning-on and turning-off of a first switch and a second switch, thereby reducing energy loss, improving conversion efficiency of the inverter, and improving a power generation capacity.

According to a first aspect, an embodiment of this application provides an inverter, including: a direct-current conversion unit, a busbar unit, and an inversion unit; where the direct-current conversion unit includes a first positive input terminal, a first negative input terminal, a second positive input terminal, a second negative input terminal, a first direct current DC-to-DC module, a second DC-to-DC module, a first on/off control device, a second on/off control device, a first switch, and a second switch;

the first positive input terminal is connected to a first terminal of the first DC-to-DC module and one terminal of the first on/off control device, the first negative input terminal is connected to a second terminal of the first DC-to-DC module and a negative electrode of the busbar unit through the first switch, the other side of the first negative input terminal is connected to the second positive input terminal through the second switch, and a third terminal of the first DC-to-DC module is connected to another terminal of the first on/off control device and a positive electrode of the busbar unit;

the second positive input terminal is connected to a first terminal of the second DC-to-DC module and one terminal of the second on/off control device, the second negative input terminal is connected to a second terminal of the second DC-to-DC module and the negative electrode of the busbar unit, and a third terminal of the second DC-to-DC module is connected to another terminal of the second on/off control device and the positive electrode of the busbar unit; and an input terminal of the inversion unit is connected to the busbar unit, and the inversion unit is configured to convert direct-current voltage between the positive electrode and the negative electrode of the busbar unit into alternating current.

In an embodiment, when the first on/off control device is a first diode, and the second on/off control device is a second diode, the other side of the first positive input terminal is connected to the first terminal of the first DC-to-DC module and an anode of the first diode, and the third terminal of the first DC-to-DC module is connected to a cathode of the first diode and the positive electrode of the busbar unit; and the other side of the second positive input terminal is connected to the first terminal of the second DC-to-DC module and an anode of the second diode, and the third terminal of the second DC-to-DC module is connected to a cathode of the second diode and the positive electrode of the busbar unit.

In an embodiment, the inverter further includes a controller, and the controller is configured to: perform detection on an operating state of the inversion unit, and when the inversion unit is in the operating state, perform detection on output voltage of the first photovoltaic string and output voltage of the second photovoltaic string.

In an embodiment, the controller is further configured to: when detecting that the inversion unit is not operating, control the second switch to be turned off and control the first switch to be turned off or turned on.

In an embodiment, the controller is further configured to: when a sum of the output voltage of the first photovoltaic string and the output voltage of the second photovoltaic string is less than a first threshold, control the first switch to be turned off, the second switch to be turned on, the first DC-to-DC module to operate, and the second DC-to-DC module not to operate, where the first threshold is greater than or equal to voltage required by the busbar unit when the inversion power supply is connected to the grid.

In an embodiment, the controller is further configured to: when a sum of the output voltage of the first photovoltaic string and the output voltage of the second photovoltaic string is greater than or equal to a first threshold and less than a second threshold, control the first switch to be turned off, the second switch to be turned on, and the first DC-to-DC module and the second DC-to-DC module not to operate, and energy input to the inverter is directly input to the busbar unit through the second switch and the first diode.

In an embodiment, the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second DC-to-DC module to operate, where the third threshold is greater than or equal to the first threshold and less than the second threshold.

In an embodiment, the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally, and energy input to the first input terminal is directly transmitted to the busbar unit through the first diode and the first switch.

In an embodiment, the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate, and energy input to the second input terminal is directly transmitted to the busbar unit through the second diode.

In an embodiment, the controller is further configured to: when a sum of the output voltage of the first photovoltaic string and the output voltage of the second photovoltaic string is greater than a second threshold, and the output voltage of the first photovoltaic string is greater than a fourth threshold, or the output voltage of the second photovoltaic string is greater than the fourth threshold, control the inversion unit not to operate, and report an alarm, where the fourth threshold is a maximum output value of the inverter.

According to the inverter provided in this embodiment of this application, the first switch and the second switch are disposed in the direct-current conversion unit, so as to adjust a use status of the DC/DC module in the direct-current conversion unit based on turning-on and turning-off of the first switch and the second switch, thereby reducing energy loss, improving conversion efficiency of the inverter, and improving a power generation capacity.

According to a second aspect, an embodiment of this application provides an inverter, including: a direct-current conversion unit, a busbar unit, and an inversion unit; where the direct-current conversion unit includes a first positive input terminal, a first negative input terminal, a second positive input terminal, a second negative input terminal, a first direct current DC-to-DC module, a second DC-to-DC module, a first on/off control device, a second on/off control device, a first switch, and a second switch;

the first negative input terminal is connected to a first terminal of the first DC-to-DC module and one terminal of the first on/off control device, the first negative input terminal is further connected to the second positive input terminal through the second switch, the other end of the first positive input terminal is connected to a second terminal of the first DC-to-DC module and a positive electrode of the busbar unit, and a third terminal of the first DC-to-DC module is connected to a negative electrode of the busbar unit and another terminal of the first on/off control device;

the second negative input terminal is connected to a first terminal of the second DC-to-DC module and one terminal of the second on/off control device, the second positive input terminal is connected to a second terminal of the second DC-to-DC module and a positive electrode of the busbar unit through the first switch, and a third terminal of the second DC-to-DC module is connected to a negative electrode of the busbar unit and another terminal of the second on/off control device; and an input terminal of the inversion unit is connected to the busbar unit, and the inversion unit is configured to convert direct-current voltage between the positive electrode and the negative electrode of the busbar unit into alternating current.

In an embodiment, when the first on/off control device is a first diode, and the second on/off control device is a second diode, the other end of the first negative input terminal is connected to the first terminal of the first DC-to-DC module and a cathode of the first diode, and the third terminal of the first DC-to-DC module is connected to the positive electrode of the busbar unit and an anode of the first diode; and the other end of the second negative input terminal is connected to the first terminal of the second DC-to-DC module and a cathode of the second diode, and the third terminal of the second DC-to-DC module is connected to the negative electrode of the busbar unit and an anode of the second diode.

In an embodiment, the inverter further includes a controller, and the controller is configured to: perform detection on an operating state of the inversion unit, and when the inversion unit is in the operating state, perform detection on output voltage of the first photovoltaic string and output voltage of the second photovoltaic string.

In an embodiment, the controller is further configured to: when detecting that the inversion unit is not operating, control the second switch to be turned off and control the first switch to be turned off or turned on.

In an embodiment, the controller is further configured to: when a sum of the output voltage of the first photovoltaic string and the output voltage of the second photovoltaic string is less than a first threshold, control the first switch to be turned off, the second switch to be turned on, the first DC-to-DC module not to operate, and the second DC-to-DC module to operate, where the first threshold is greater than or equal to voltage required by the busbar unit when the inversion power supply is connected to the grid.

In an embodiment, the controller is further configured to: when a sum of the output voltage of the first photovoltaic string and the output voltage of the second photovoltaic string is greater than or equal to a first threshold and less than a second threshold, control the first switch to be turned off, the second switch to be turned on, and the first DC-to-DC module and the second DC-to-DC module not to operate, and energy input to the inverter is directly input to the busbar unit through the second switch and the first diode.

In an embodiment, the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second DC-to-DC module to operate, where the third threshold is greater than or equal to the first threshold and less than the second threshold.

In an embodiment, the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally, and energy input to the second input terminal is directly transmitted to the busbar unit through the second diode.

In an embodiment, the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate, and energy input to the second input terminal is directly transmitted to the busbar unit through the second diode.

In an embodiment, the controller is further configured to: when a sum of the output voltage of the first photovoltaic string and the output voltage of the second photovoltaic string is greater than a second threshold, and the output voltage of the first photovoltaic string is greater than a fourth threshold, or the output voltage of the second photovoltaic string is greater than the fourth threshold, control the inversion unit not to operate, and report an alarm, where the fourth threshold is a maximum output value of the inverter.

According to the inverter provided in this embodiment of this application, the first switch and the second switch are disposed in the direct-current conversion unit, so as to adjust a use status of the DC/DC module in the direct-current conversion unit based on turning-on and turning-off of the first switch and the second switch, thereby reducing energy loss, improving conversion efficiency of the inverter, and improving a power generation capacity.

DESCRIPTION OF EMBODIMENTS

Embodiments of this application are described below with reference to the accompanying drawings. Apparently, the described embodiments are only some rather than all of the embodiments of this application. A person of ordinary skill in the art may be aware that with the evolution of a graph computing framework and the emergence of new application scenarios, the technical solutions provided in the embodiments of this application are equally applicable to similar technical problems.

The embodiments of this application provide an inverter, which can adjust a use status of a DC/DC module based on turning-on and turning-off of a first switch and a second switch, thereby reducing energy loss, improving conversion efficiency of the inverter, and improving a power generation capacity.

Figure 1:
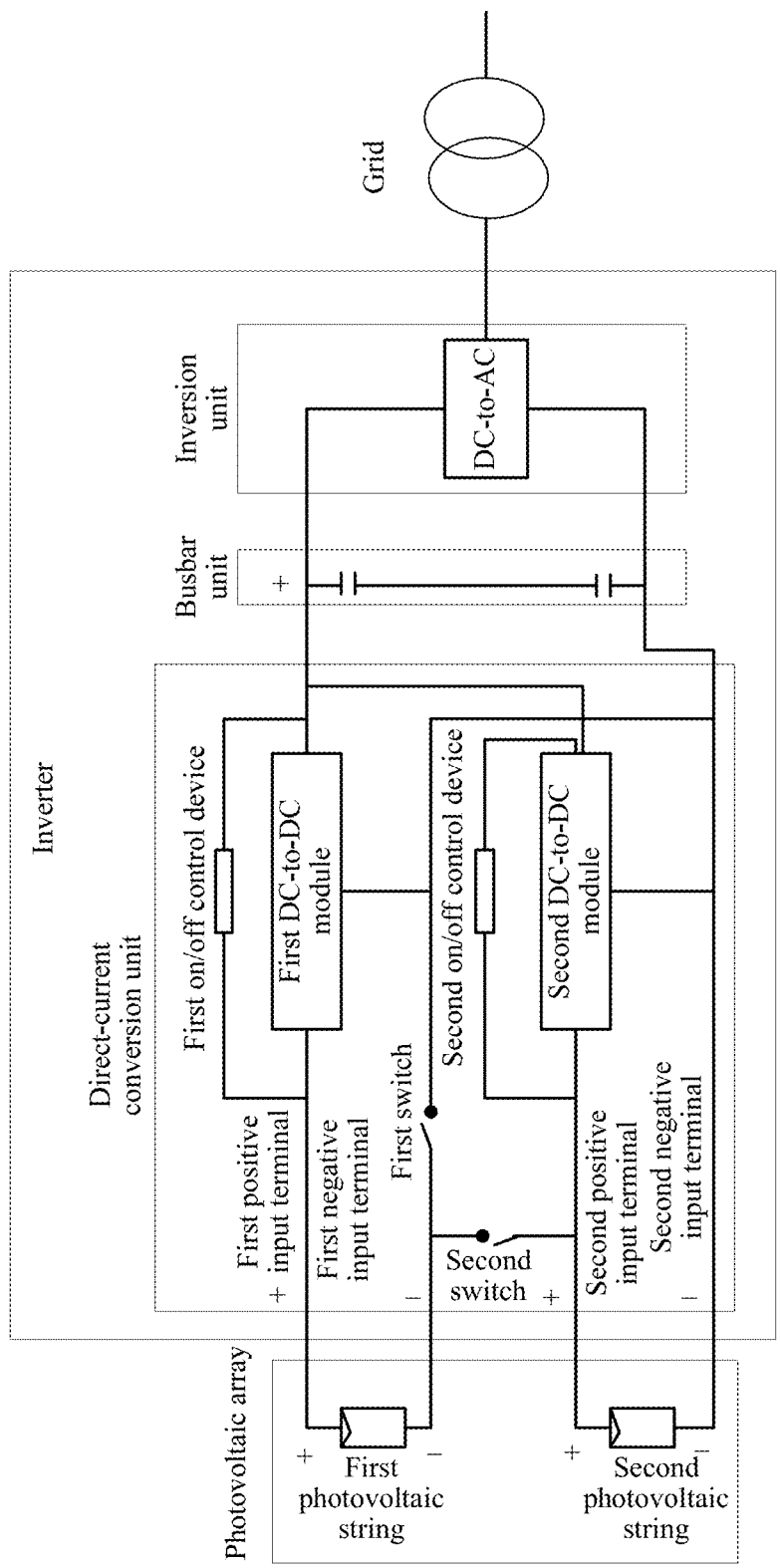
FIG. 1 is a schematic structural diagram of an inverter according to an embodiment of this application.

FIG. 1 is a schematic structural diagram of an inverter according to an embodiment of this application.

As shown in FIG. 1, the inverter provided in this embodiment of this application may include:

a direct-current conversion unit, a busbar unit, and an inversion unit, where the direct-current conversion unit includes a first positive input terminal, a first negative input terminal, a second positive input terminal, a second negative input terminal, a first direct current DC-to-DC module, a second DC-to-DC module, a first on/off control device, a second on/off control device, a first switch, and a second switch;

the first positive input terminal is connected to a first terminal of the first DC-to-DC module and one terminal of the first on/off control device, the first negative input terminal is connected to a second terminal of the first DC-to-DC module and a negative electrode of the busbar unit through the first switch, the other side of the first negative input terminal is connected to the second positive input terminal through the second switch, and a third terminal of the first DC-to-DC module is connected to another terminal of the first on/off control device and a positive electrode of the busbar unit;

the second positive input terminal is connected to a first terminal of the second DC-to-DC module and one terminal of the second on/off control device, the second negative input terminal is connected to a second terminal of the second DC-to-DC module and the negative electrode of the busbar unit, and a third terminal of the second DC-to-DC module is connected to another terminal of the second on/off control device and the positive electrode of the busbar unit; and an input terminal of the inversion unit is connected to the busbar unit, and the inversion unit is configured to convert direct-current voltage between the positive electrode and the negative electrode of the busbar unit into alternating current.

According to the inverter provided in this embodiment of this application, the first switch and the second switch are disposed in the direct-current conversion unit, so as to adjust a use status of the DC/DC module in the direct-current conversion unit based on turning-on and turning-off of the first switch and the second switch, thereby reducing energy loss, improving conversion efficiency of the inverter, and improving a power generation capacity.

In an embodiment, one side of the first positive input terminal is connected to a positive electrode of a first photovoltaic string, and one side of the first negative input terminal is connected to a negative electrode of the first photovoltaic string; and one side of the second positive input terminal is connected to a positive electrode of the second photovoltaic string, and one side of the second negative input terminal is connected to a negative electrode of the second photovoltaic string.

The other side of the first positive input terminal is connected to the first terminal of the first DC-to-DC module and one terminal of the first on/off control device, the other side of the first negative input terminal is connected to the second terminal of the first DC-to-DC module and the negative electrode of the busbar unit through the first switch, the other side of the first negative input terminal is connected to the second positive input terminal through the second switch, and the third terminal of the first DC-to-DC module is connected to the other terminal of the first on/off control device and the positive electrode of the busbar unit.

The other side of the second positive input terminal is connected to the first terminal of the second DC-to-DC module and one terminal of the second on/off control device, the other side of the second negative input terminal is connected to a negative input terminal of the second DC-to-DC module and the negative electrode of the busbar unit, and the third terminal of the second DC-to-DC module is connected to the other terminal of the second on/off control device and the positive electrode of the busbar unit.

In this embodiment of this application, the first on/off control device and the second on/off control device each may be a device such as a diode or switch for controlling opening and closing of lines.

The first switch and the second switch each may also be at least one of a contactor, a relay, and a semiconductor switching device.

The DC-to-DC module includes but is not limited to a boost, buck-boost, or Cuk circuit.

The busbar unit may be connected to the inversion unit through the positive electrode and the negative electrode, or may be connected to the inversion unit through the positive electrode, midpoint potential, and the negative electrode.

There is not necessarily only one direct-current conversion unit, but may be at least two direct-current conversion units. When there are at least two direct-current conversion units, each direct-current conversion unit is connected to the busbar unit.

The first photovoltaic string and the second photovoltaic string each may be a combination of photovoltaic battery panels connected in series and/or in parallel.

Figure 2:
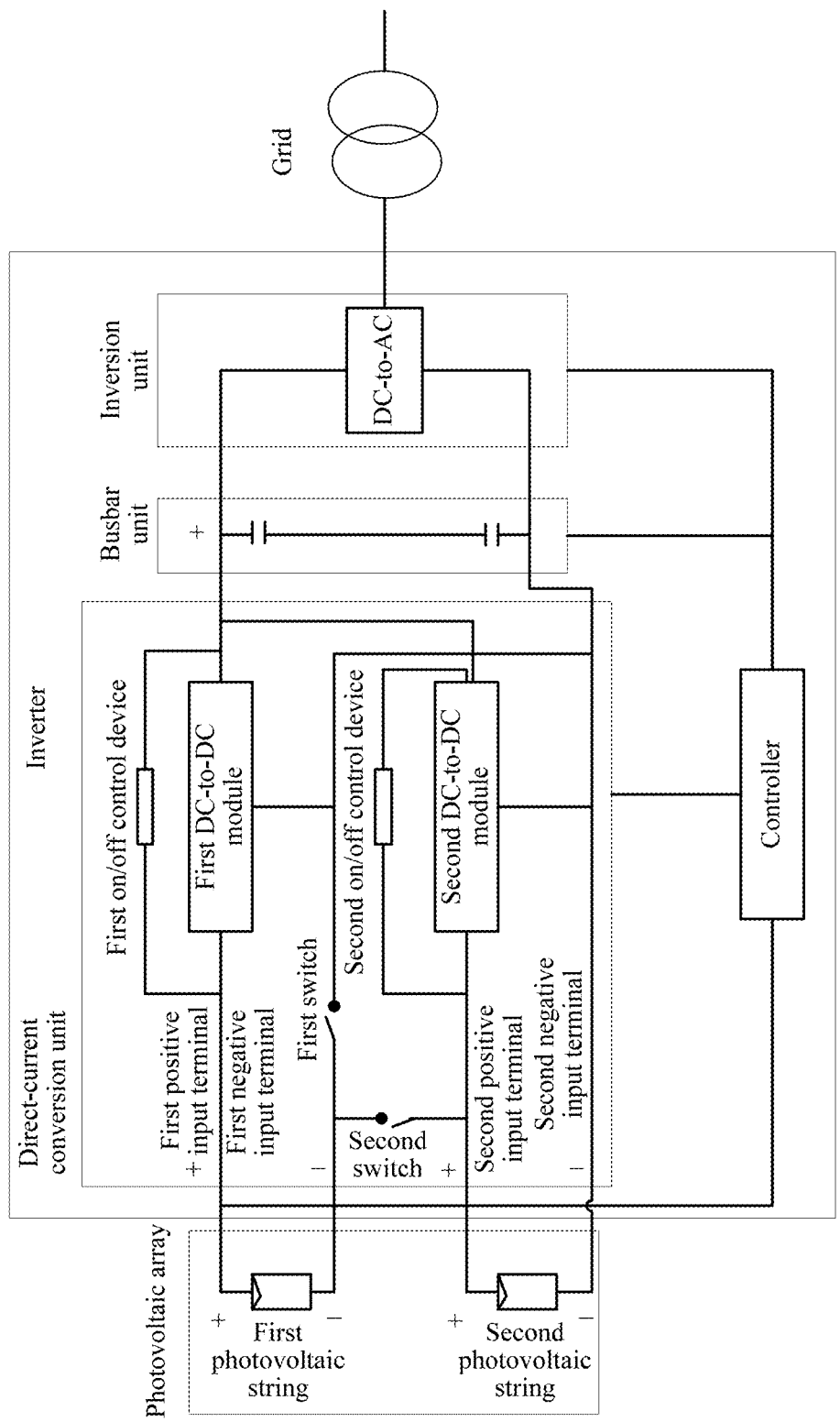
FIG. 2 is another schematic structural diagram of an inverter according to an embodiment of this application.

In this embodiment of this application, the turning-on and turning-off of the first switch and the second switch can be controlled by a controller. As shown in FIG. 2, in another embodiment of the inverter provided in the embodiments of this application, the inverter further includes a controller.

The controller is configured to: perform detection on an operating state of the inversion unit, and when the inversion unit is in the operating state, perform detection on output voltage of the first photovoltaic string and output voltage of the second photovoltaic string.

In this embodiment of this application, according to the operating state of the inversion unit, the output voltage of the first photovoltaic string, and the output voltage of the second photovoltaic string, a control status of the controller may be categorized into seven states.

In a first state, the controller is further configured to: when detecting that the inversion unit is not operating, control the second switch to be turned off and control the first switch to be turned off or turned on.

In this embodiment of this application, if the inversion unit is not operating, neither the first DC-to-DC module nor the second DC-to-DC module needs to work, so that loss generated by the DC-to-DC module can be effectively reduced.

In a second state, the controller is further configured to: when a sum of the output voltage of the first photovoltaic string and the output voltage of the second photovoltaic string is less than a first threshold, control the first switch to be turned off, the second switch to be turned on, the first DC-to-DC module to operate, and the second DC-to-DC module not to operate, where the first threshold is greater than or equal to voltage required by the busbar unit when the inversion power supply is connected to the grid. In an embodiment, the first threshold is a lower limit of voltage that the busbar unit can withstand.

In this embodiment of this application, when the sum of the output voltage of the first photovoltaic string and the output voltage of the second photovoltaic string is less than the first threshold, the first switch is turned off, the second switch is turned on, and the first photovoltaic string and the second photovoltaic string are connected in series, thereby increasing overall output voltage. In this case, only the first DC-to-DC module needs to operate to raise the output voltage to the first threshold.

For example, if line voltage of the grid is 480 VAC, voltage withstood by the busbar unit ranges from 770 V to 1000 V. In other words, the lower and upper limits of the voltage withstood by the busbar unit in this scenario are 770 V and 1000 V, respectively. Then the first threshold is 770 V, and if the respective output voltage corresponding to the first photovoltaic string and the second photovoltaic string is 300 V, the sum of the output voltage of the photovoltaic strings is 600 V, which is less than 770 V. In this case, the controller controls the first switch to be turned off and the second switch to be turned on, and the first photovoltaic string and the second photovoltaic string are connected in series. The first DC-to-DC module operates to raise the output voltage from 600 V to 770 V, and the second DC-to-DC module does not need to operate, thereby reducing energy loss, improving conversion efficiency of the inverter, and improving a power generation capacity.

In a third state, the controller is further configured to: when a sum of the output voltage of the first photovoltaic string and the output voltage of the second photovoltaic string is greater than a first threshold and less than a second threshold, control the first switch to be turned off, the second switch to be turned on, and the first DC-to-DC module and the second DC-to-DC module not to operate, and energy input to the inverter is directly input to the busbar unit through the second switch and the first diode. In an embodiment, the first threshold is the lower limit of the voltage that the busbar unit can withstand, and the second threshold is the upper limit of the voltage that the busbar unit can withstand.

Still using the foregoing scenario as an example, in the foregoing scenario, the first threshold is 770 V and the second threshold is 1000 V. As light increases, both the output voltage of the first photovoltaic string and that of the second photovoltaic string exceed 385 V, for example, are 390 V. In this case, the controller controls the first switch to be turned off and the second switch to be turned on, and the first photovoltaic string and the second photovoltaic string are connected in series. Therefore, the sum of the output voltages of the two photovoltaic strings is greater than 770 V, and does not need to be further raised through the DC-to-DC module. Energy is input to the busbar unit through the first on/off control device, thereby meeting requirements for connection of the inverter to the grid. In this case, neither the first DC-to-DC module nor the second DC-to-DC module needs to operate, thereby reducing energy loss, improving conversion efficiency of the inverter, and improving a power generation capacity.

In a fourth state, the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second C-to-DC module to operate, where the third threshold is greater than or equal to the first threshold and less than the second threshold. The second threshold is the upper limit of the voltage that the busbar unit can withstand, and the third threshold is the lower limit of the voltage that the busbar unit can withstand.

Still using the foregoing scenario as an example, in the foregoing scenario, the first threshold is 770 V, the second threshold is 1000 V, and the third threshold is 770 V. As light increases, both the output voltage of the first photovoltaic string and that of the second photovoltaic string reach 500 V and are less than the minimum value of 770 V of busbar voltage. If the first switch is turned off and the second switch is turned on at this time, input series voltage reaches 1000 V, which is an application critical value for the inverter of 1000 V. In this case, for the sake of system safety, the first switch needs to be turned on and the second switch needs to be turned off, so that the first DC-to-DC module and the second DC-to-DC module enter the operating state, to raise the output voltage to 770 V for grid-connected power generation.

In a fifth state, the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally, and energy input to the first input terminal is directly transmitted to the busbar unit through the first diode and the first switch. The second threshold is the upper limit of the voltage that the busbar unit can withstand, and the third threshold is the lower limit of the voltage that the busbar unit can withstand.

Still using the foregoing scenario as an example, in the foregoing scenario, the first threshold is 770 V, the second threshold is 1000 V, and the third threshold is 770 V. As light increases, the output voltage of the first photovoltaic string reaches 770 V, and the output voltage of the second string of battery panels reaches 600 V. In this case, the sum of the output voltages of the two photovoltaic strings is 1370 V, which is greater than 1000 V, and the controller needs to control the second switch to be turned off and the first switch to be turned on. In this case, the first DC-to-DC module does not need to operate, and the output voltage of the first photovoltaic string may be directly transmitted to the busbar unit through the first on/off control device; and the second DC-to-DC module operates to raise the output voltage of the second photovoltaic string to 770 V, which is then transmitted to the busbar unit.

In a sixth state, the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate, and energy input to the second input terminal is directly transmitted to the busbar unit through the second diode. The second threshold is the upper limit of the voltage that the busbar unit can withstand, and the third threshold is the lower limit of the voltage that the busbar unit can withstand.

In this embodiment of this application, the situation of the sixth state is similar to that of the fifth state. The sum of the output voltage of the first photovoltaic string and the output voltage of the second photovoltaic string is greater than the second threshold, namely 1000 V, but the output voltage of the first photovoltaic string is less than the second threshold, namely 770 V, and the output voltage of the second photovoltaic string is greater than 770 V. In this case, the first DC-to-DC module needs to operate to raise the output voltage of the first photovoltaic string to the third threshold of 770 V; the second DC-to-DC module does not need to operate, and the output voltage of the second photovoltaic string is directly transmitted to the busbar unit through the second on/off control device.

In a seventh state, the controller is further configured to: when a sum of the output voltage of the first photovoltaic string and the output voltage of the second photovoltaic string is greater than a second threshold, and the output voltage of the first photovoltaic string is greater than a fourth threshold, or the output voltage of the second photovoltaic string is greater than the fourth threshold, control the inversion unit not to operate, and report an alarm, where the fourth threshold is a maximum output value of the inverter.

Still using the foregoing scenario as an example, as light increases, the output voltage of the first photovoltaic string reaches 770 V, and the output voltage of the second string of battery panels also reaches 770 V. In this case, the two photovoltaic strings do not need to be connected in series, and therefore the controller controls the second switch to be turned off and the first switch to be turned on. In addition, neither the first DC-to-DC module nor the second DC-to-DC module needs to operate, the output voltage of the first photovoltaic string may be directly transmitted to the busbar through the first on/off control device, and the output voltage of the second photovoltaic string may be directly transmitted to the busbar through the second on/off control device.

Actually, the first on/off control device and the second on/off control device in the examples corresponding to FIG. 1 and FIG. 2 may be diodes or switches, which are described in the following with FIG. 3 and FIG. 4, respectively.

Figure 3:
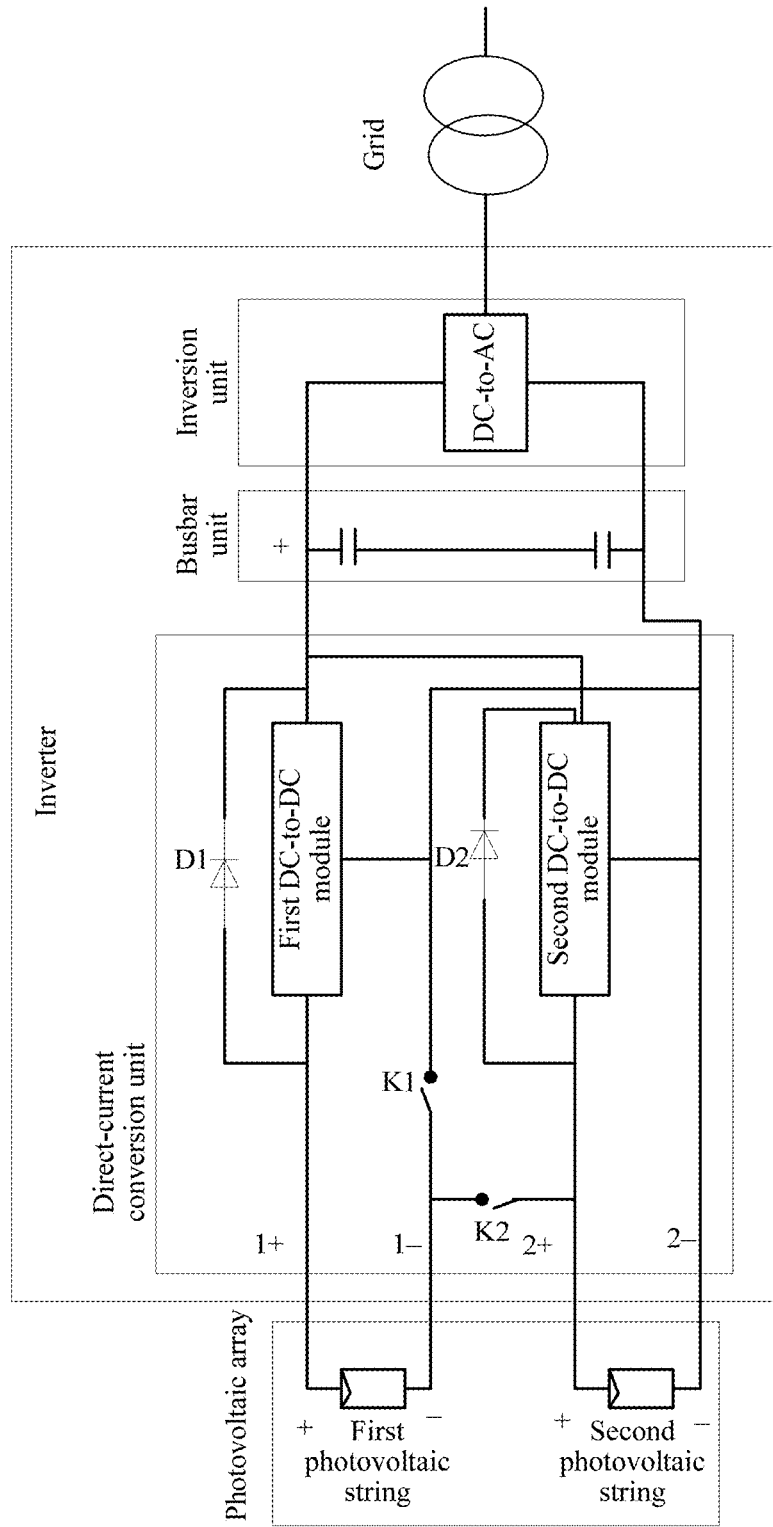
FIG. 3 is another schematic structural diagram of an inverter according to an embodiment of this application.

As shown in FIG. 3, in another embodiment of the inverter provided in the embodiments of this application, the first on/off control device may be a first diode D1, and the second on/off control device is a second diode D2. In this case, the other side of the first positive input terminal is connected to the first terminal of the first DC-to-DC module and an anode of the first diode D1, and the third terminal of the first DC-to-DC module is connected to a cathode of the first diode D1 and the positive electrode of the busbar unit; and the other side of the second positive input terminal is connected to the first terminal of the second DC-to-DC module and an anode of the second diode D2, and the third terminal of the second DC-to-DC module is connected to a cathode of the second diode D2 and the positive electrode of the busbar unit.

Figure 4:
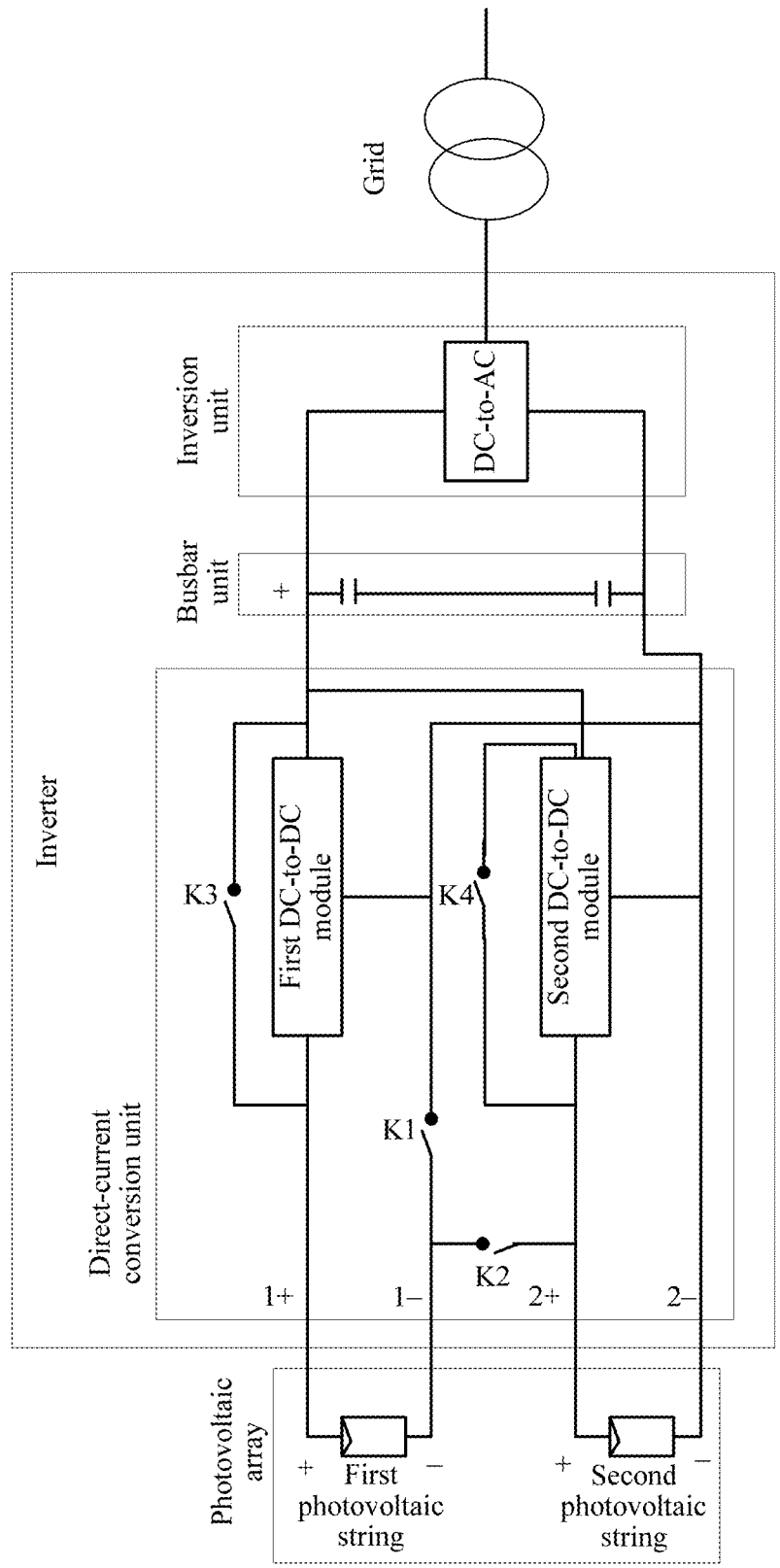
FIG. 4 is another schematic structural diagram of an inverter according to an embodiment of this application.

As shown in FIG. 4, in another embodiment of the inverter provided in the embodiments of this application, the first on/off control device may be a third switch K3, and the second on/off control device is a fourth switch K4. In this case, the other side of the first positive input terminal is connected to the first terminal of the first DC-to-DC module and one terminal of the third switch K3, the other side of the first negative input terminal is connected to the second terminal of the first DC-to-DC module and the negative electrode of the busbar unit through the first switch, the other side of the first negative input terminal is connected to the second positive input terminal through the second switch, and the third terminal of the first DC-to-DC module is connected to the other terminal of the third switch K3 and the positive electrode of the busbar unit; and the other side of the second positive input terminal is connected to the first terminal of the second DC-to-DC module and one terminal of the fourth switch K4, the other side of the second negative input terminal is connected to a negative input terminal of the second DC-to-DC module and the negative electrode of the busbar unit, and the third terminal of the second DC-to-DC module is connected to the other terminal of the fourth switch K4 and the positive electrode of the busbar unit.

Figure 5:
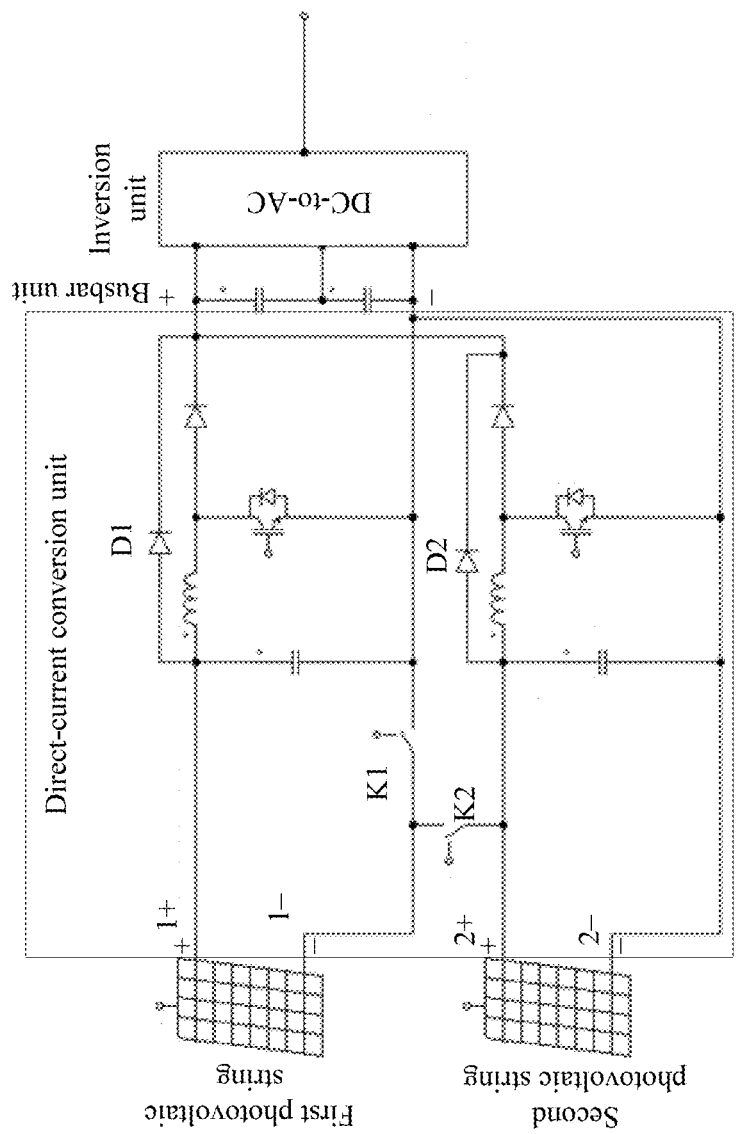
FIG. 5 is another schematic structural diagram of an inverter according to an embodiment of this application.

Actually, the first DC-to-DC module and the second DC-to-DC module each may be implemented in the form of a circuit. As shown in FIG. 5, in another embodiment of the inverter provided in the embodiments of this application, the first DC-to-DC module and the second DC-to-DC module each are implemented by a circuit in which an inductor and a capacitor are connected in series, then connected to a transistor in parallel, and then connected to a diode. In the example of the structure shown in FIG. 5, the first on/off control device is the first diode, and the second on/off control device is the second diode. The circuit structures of the first DC-to-DC module and the second DC-to-DC module are not limited, provided that the function of raising voltage can be implemented.

Figure 6:
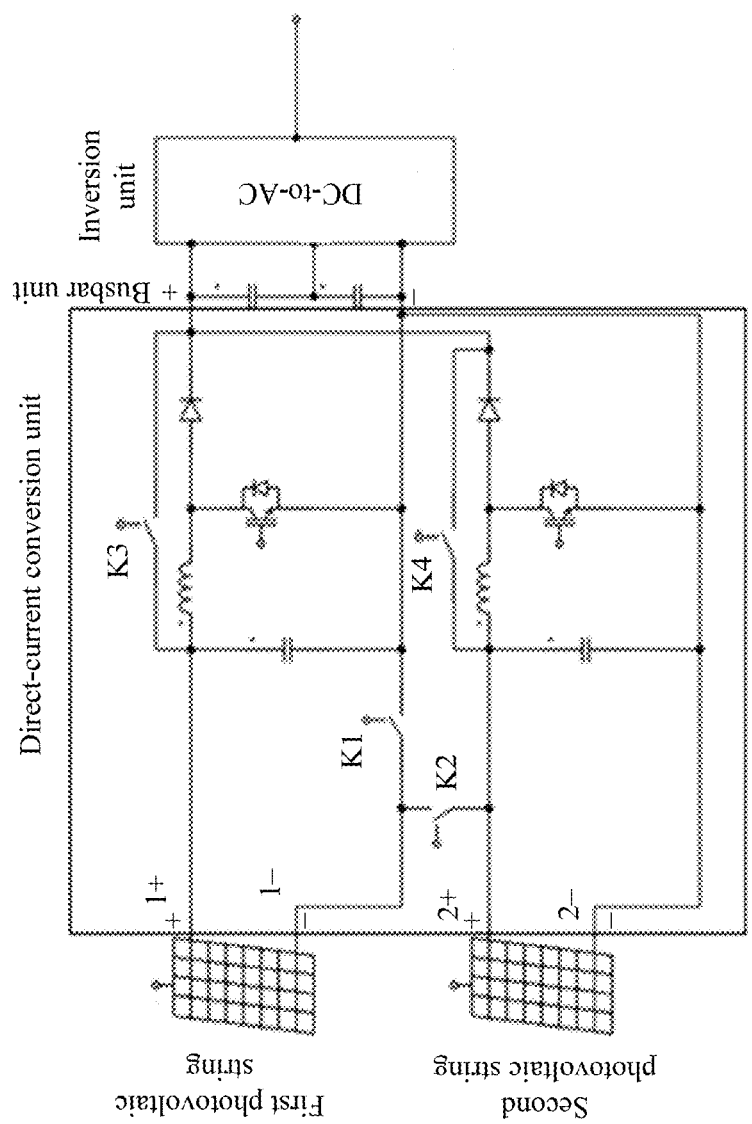
FIG. 6 is another schematic structural diagram of an inverter according to an embodiment of this application.

As shown in FIG. 6, in another embodiment of the inverter provided in the embodiments of this application, the circuits of the first DC-to-DC module and the second DC-to-DC module are the same as the circuits shown in FIG. 5, except that the first on/off control device is the third switch, and the second on/off control device is the fourth switch.

Figure 7:
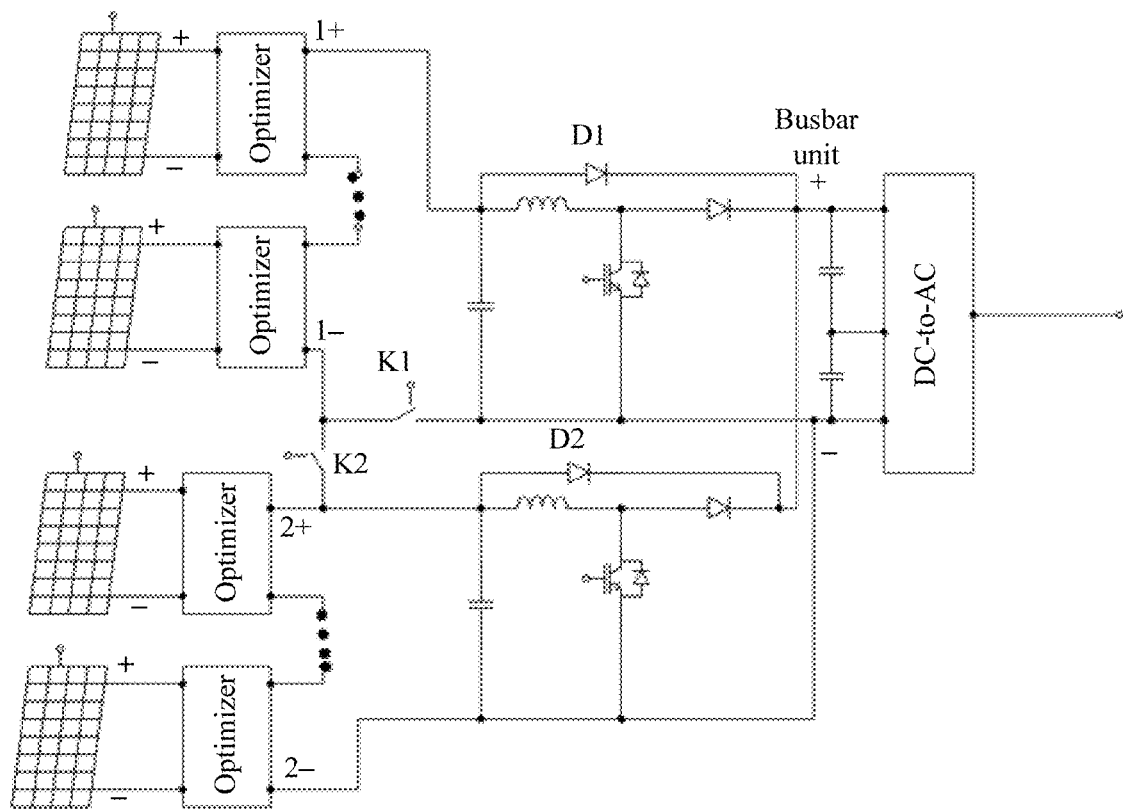
FIG. 7 is another schematic structural diagram of an inverter according to an embodiment of this application.

In all the foregoing solutions, only the first photovoltaic string and the second photovoltaic string are described. Actually, one inverter may be connected to a plurality of photovoltaic strings, and these photovoltaic strings may also be connected to the inverter through optimizers. FIG. 7 shows a scenario in which a plurality of photovoltaic strings is connected to the inverter through optimizers. In this scenario, the first on/off control device is the first diode, and the second on/off control device is the second diode.

Figure 8:
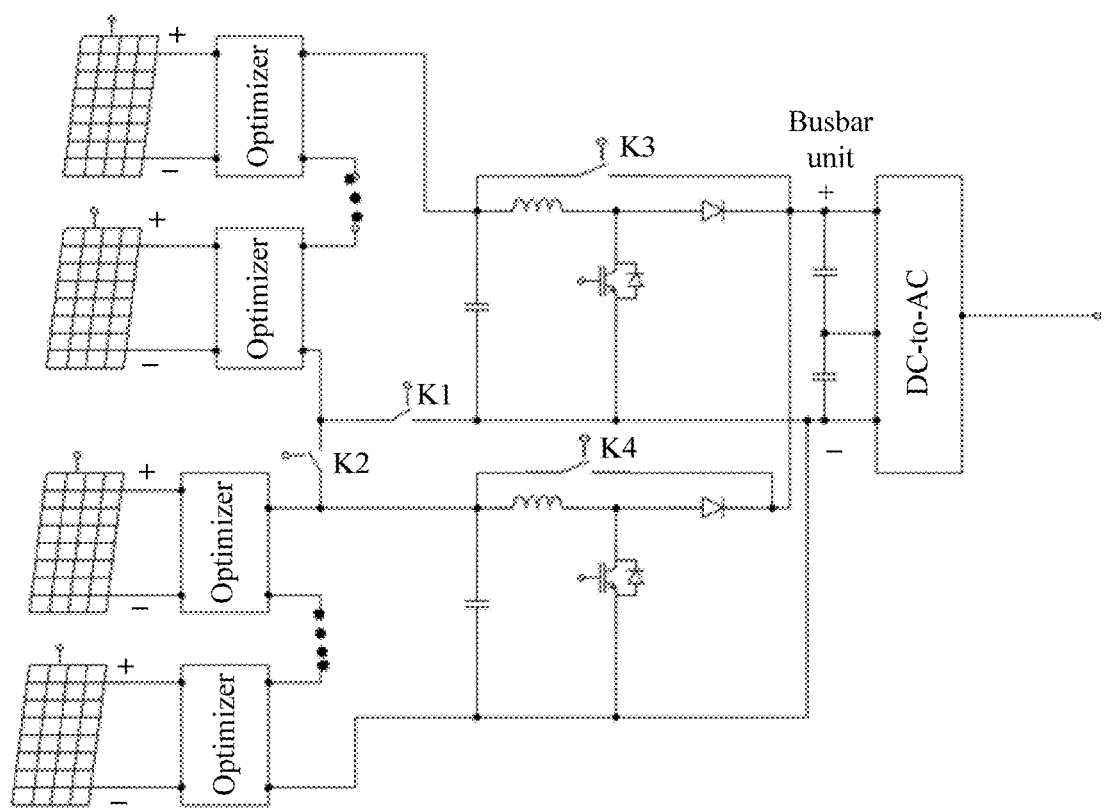
FIG. 8 is another schematic structural diagram of an inverter according to an embodiment of this application.

As shown in FIG. 8, in another embodiment of the inverter provided in the embodiments of this application, the scenario in which a plurality of photovoltaic strings is connected to the inverter through optimizers is basically the same as the situation shown in FIG. 7, except that the first on/off control device is the third switch, and the second on/off control device is the fourth switch.

Figure 9:
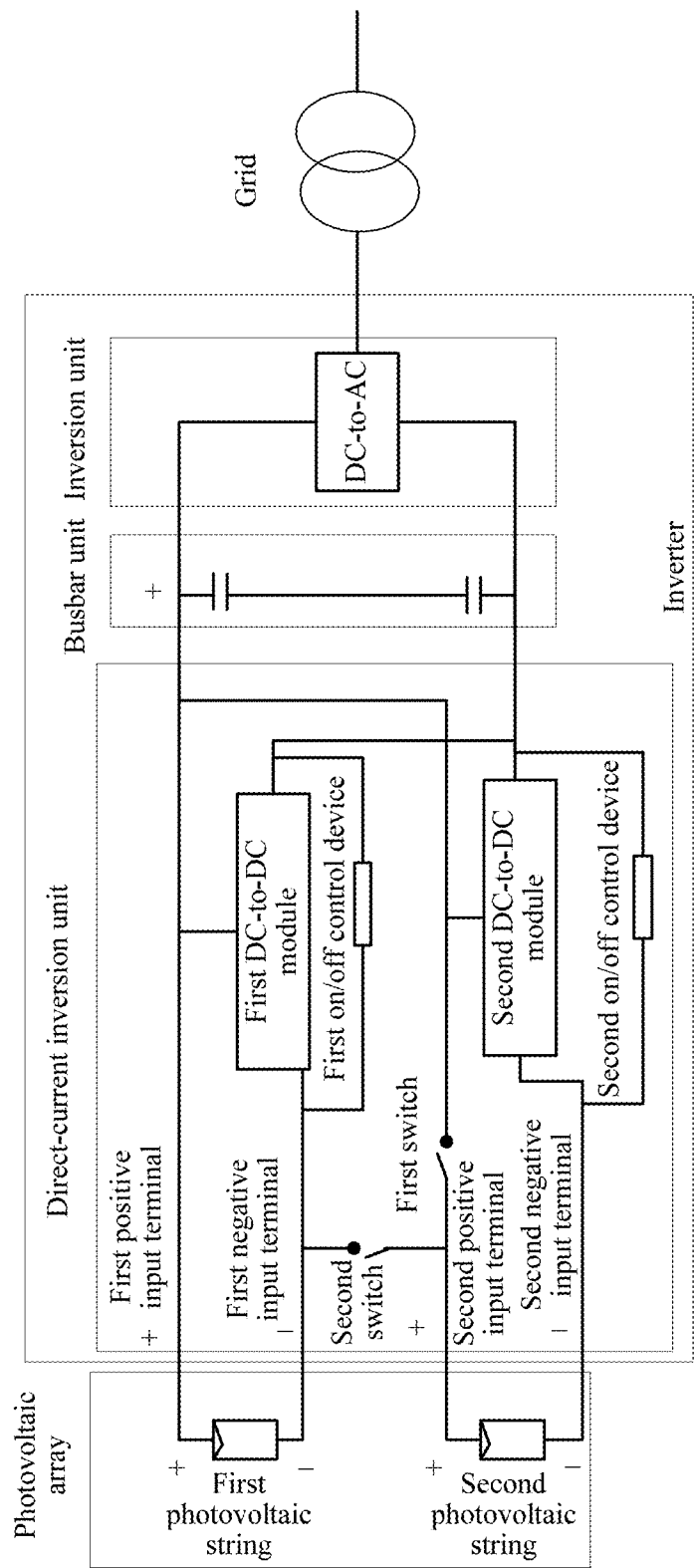
FIG. 9 is another schematic structural diagram of an inverter according to an embodiment of this application.

FIG. 9 is a schematic diagram of another embodiment of the inverter provided in the embodiments of this application.

As shown in FIG. 9, in another embodiment of the inverter provided in the embodiments of this application, the inverter includes: a direct-current conversion unit, a busbar unit, and an inversion unit, where the direct-current conversion unit includes a first positive input terminal, a first negative input terminal, a second positive input terminal, a second negative input terminal, a first direct current DC-to-DC module, a second DC-to-DC module, a first on/off control device, a second on/off control device, a first switch, and a second switch.

One side of the first positive input terminal is connected to a positive electrode of a first photovoltaic string, and one side of the first negative input terminal is connected to a negative electrode of the first photovoltaic string; and one side of the second positive input terminal is connected to a positive electrode of the second photovoltaic string, and one side of the second negative input terminal is connected to a negative electrode of the second photovoltaic string.

The other end of the first negative input terminal is connected to a first terminal of the first DC-to-DC module and one terminal of the first on/off control device, the other end of the first negative input terminal is further connected to the second positive input terminal through the second switch, the other end of the first positive input terminal is connected to a second terminal of the first DC-to-DC module and a positive electrode of the busbar unit, and a third terminal of the first DC-to-DC module is connected to a negative electrode of the busbar unit and another terminal of the first on/off control device.

The other end of the second negative input terminal is connected to a first terminal of the second DC-to-DC module and one terminal of the second on/off control device, the other end of the second positive input terminal is connected to a second terminal of the second DC-to-DC module and the positive electrode of the busbar unit through the first switch, and a third terminal of the second DC-to-DC module is connected to the negative electrode of the busbar unit and another terminal of the second on/off control device.

An input terminal of the inversion unit is connected to the busbar unit, and the inversion unit is configured to convert direct-current voltage between the positive electrode and the negative electrode of the busbar unit into alternating current.

In this embodiment of this application, the first on/off control device and the second on/off control device each may be a device such as a diode or switch for controlling opening and closing of lines.

The first switch and the second switch each may also be at least one of a contactor, a relay, and a semiconductor switching device.

The DC-to-DC module includes but is not limited to a boost, buck-boost, or Cuk circuit.

The busbar unit may be connected to the inversion unit through the positive electrode and the negative electrode, or may be connected to the inversion unit through the positive electrode, midpoint potential, and the negative electrode.

There is not necessarily only one direct-current conversion unit, but may be at least two direct-current conversion units. When there are at least two direct-current conversion units, each direct-current conversion unit is connected to the busbar unit.

The first photovoltaic string and the second photovoltaic string each may be a combination of photovoltaic battery panels connected in series and/or in parallel.

Figure 10:
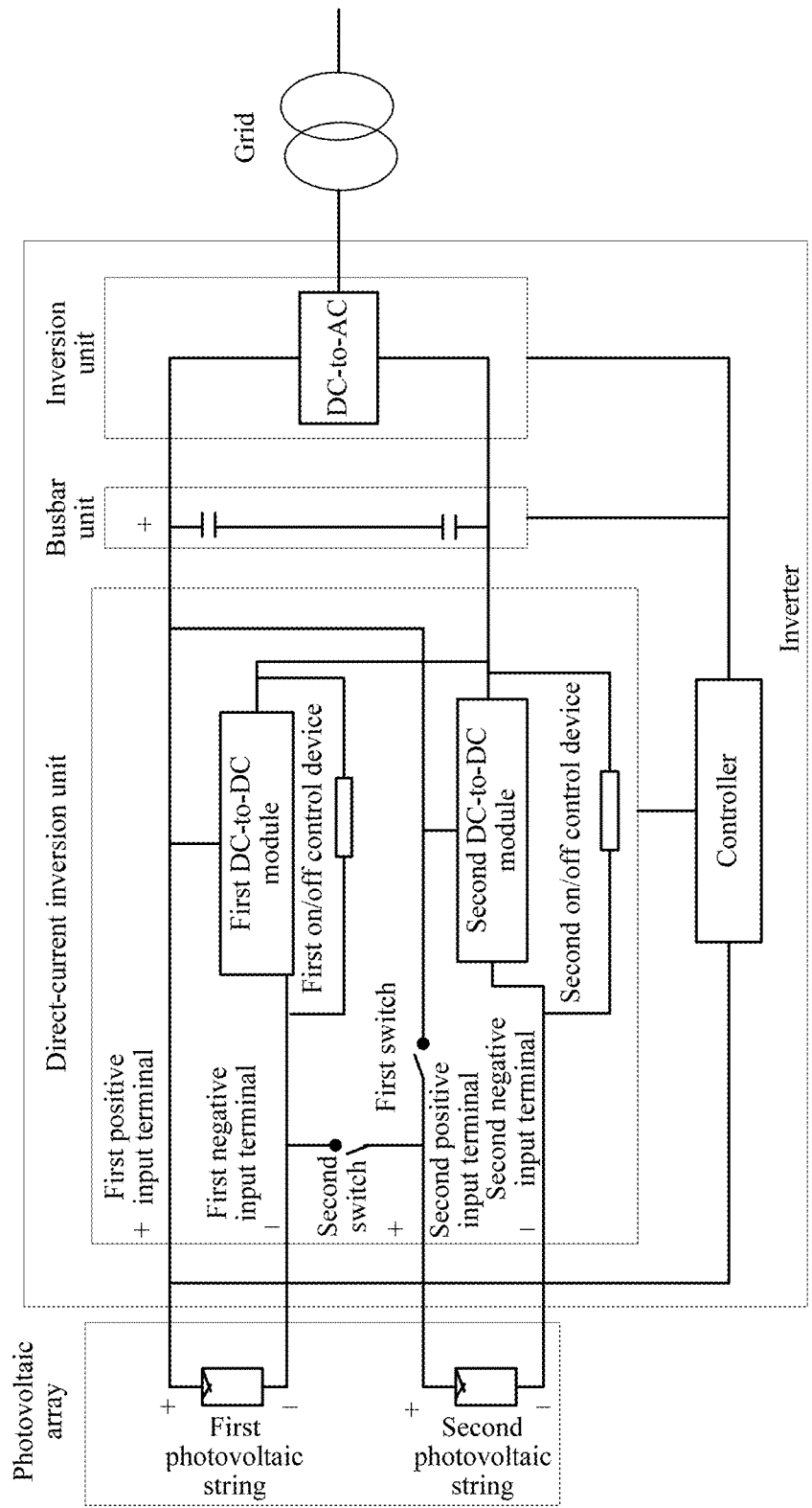
FIG. 10 is another schematic structural diagram of an inverter according to an embodiment of this application.

In this embodiment of this application, the turning-on and turning-off of the first switch and the second switch can be controlled by a controller. As shown in FIG. 10, in another embodiment of the inverter provided in the embodiments of this application, the inverter further includes a controller.

The controller is configured to: perform detection on an operating state of the inversion unit, and when the inversion unit is in the operating state, perform detection on output voltage of the first photovoltaic string and output voltage of the second photovoltaic string.

In this embodiment of this application, according to the operating state of the inversion unit, the output voltage of the first photovoltaic string, and the output voltage of the second photovoltaic string, a control status of the controller may be categorized into seven states.

In a first state, the controller is further configured to: when detecting that the inversion unit is not operating, control the second switch to be turned off and control the first switch to be turned off or turned on.

In this embodiment of this application, if the inversion unit is not operating, neither the first DC-to-DC module nor the second DC-to-DC module needs to work, so that loss generated by the DC-to-DC module can be effectively reduced.

In a second state, the controller is further configured to: when a sum of the output voltage of the first photovoltaic string and the output voltage of the second photovoltaic string is less than a first threshold, control the first switch to be turned off, the second switch to be turned on, the first DC-to-DC module not to operate, and the second DC-to-DC module to operate, where the first threshold is a lower limit of voltage that the busbar unit can withstand.

In this embodiment of this application, when the sum of the output voltage of the first photovoltaic string and the output voltage of the second photovoltaic string is less than the first threshold, the first switch is turned off, the second switch is turned on, and the first photovoltaic string and the second photovoltaic string are connected in series, thereby increasing overall output voltage. In this case, only the second DC-to-DC module needs to operate to raise the output voltage to the first threshold.

For example, if line voltage of the grid is 480 VAC, voltage withstood by the busbar unit ranges from 770 V to 1000 V. In other words, the lower and upper limits of the voltage withstood by the busbar unit in this scenario are 770 V and 1000 V, respectively. Then the first threshold is 770 V, and if the respective output voltage corresponding to the first photovoltaic string and the second photovoltaic string is 300 V, the sum of the output voltage of the photovoltaic strings is 600 V, which is less than 770 V. In this case, the controller controls the first switch to be turned off and the second switch to be turned on, and the first photovoltaic string and the second photovoltaic string are connected in series. The second DC-to-DC module operates to raise the output voltage from 600 V to 770 V, and the first DC-to-DC module does not need to operate, thereby reducing energy loss, improving conversion efficiency of the inverter, and improving a power generation capacity.

In a third state, the controller is further configured to: when a sum of the output voltage of the first photovoltaic string and the output voltage of the second photovoltaic string is greater than a first threshold and less than a second threshold, control the first switch to be turned off, the second switch to be turned on, and the first DC-to-DC module and the second DC-to-DC module not to operate, where the first threshold is a lower limit of voltage that the busbar unit can withstand, and the second threshold is an upper limit of voltage that the busbar unit can withstand.

Still using the foregoing scenario as an example, in the foregoing scenario, the first threshold is 770 V, and the second threshold is 1000 V. As light increases, both the output voltage of the first photovoltaic string and that of the second photovoltaic string exceed 385 V, for example, are 390 V. In this case, the controller controls the first switch to be turned off and the second switch to be turned on, and the first photovoltaic string and the second photovoltaic string are connected in series. Therefore, the sum of the output voltages of the two photovoltaic strings is greater than 770 V, and does not need to be further raised through the DC-to-DC module. Energy is input to the busbar unit through the second on/off control device, thereby meeting requirements for connection of the inverter to the grid. In this case, neither the first DC-to-DC module nor the second DC-to-DC module needs to operate, thereby reducing energy loss, improving conversion efficiency of the inverter, and improving a power generation capacity.

In a fourth state, the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second DC-to-DC module to operate, where the second threshold is an upper limit of voltage that the busbar unit can withstand, and the third threshold is a lower limit of voltage that the busbar unit can withstand.

Still using the foregoing scenario as an example, in the foregoing scenario, the first threshold is 770 V, the second threshold is 1000 V, and the third threshold is 770 V. As light increases, both the output voltage of the first photovoltaic string and that of the second photovoltaic string reach 500 V and are less than the minimum value of 770 V of busbar voltage. If the first switch is turned off and the second switch is turned on at this time, input series voltage reaches 1000 V, which is an application critical value for the inverter of 1000 V. For the sake of system safety, the first switch needs to be turned on and the second switch tube needs to be turned off, so that the first DC-to-DC module and the second DC-to-DC module enter the operating state, to raise the output voltage to 770 V for grid-connected power generation.

In a fifth state, the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally, where the second threshold is an upper limit of voltage that the busbar unit can withstand, and the third threshold is a lower limit of voltage that the busbar unit can withstand.

Still using the foregoing scenario as an example, in the foregoing scenario, the first threshold is 770 V, the second threshold is 1000 V, and the third threshold is 770 V. As light increases, the output voltage of the first photovoltaic string reaches 770 V, and the output voltage of the second string of battery panels reaches 600 V. In this case, the sum of the output voltages of the two photovoltaic strings is 1370 V, which is greater than 1000 V, and the controller needs to control the second switch to be turned off and the first switch to be turned on. In this case, the first DC-to-DC module does not need to operate, and the output voltage of the first photovoltaic string may be directly transmitted to the busbar unit through the first on/off control device; and the second DC-to-DC module operates to raise the output voltage of the second photovoltaic string to 770 V, which is then transmitted to the busbar unit.

In a sixth state, the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate, where the second threshold is an upper limit of voltage that the busbar unit can withstand, and the third threshold is a lower limit of voltage that the busbar unit can withstand.

In this embodiment of this application, the situation of the sixth state is similar to that of the fifth state. The sum of the output voltage of the first photovoltaic string and the output voltage of the second photovoltaic string is greater than the second threshold, namely 1000 V, but the output voltage of the first photovoltaic string is less than the second threshold, namely 770 V, and the output voltage of the second photovoltaic string is greater than 770 V. In this case, the first DC-to-DC module needs to operate to raise the output voltage of the first photovoltaic string to the third threshold of 770 V; the second DC-to-DC module does not need to operate, and the output voltage of the second photovoltaic string is directly transmitted to the busbar unit through the second on/off control device.

In a seventh state, the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is greater than the third threshold, control the first switch to be turned on, the second switch to be turned off, and the first DC-to-DC module and the second DC-to-DC module not to operate, where the second threshold is an upper limit of voltage that the busbar unit can withstand, and the third threshold is a lower limit of voltage that the busbar unit can withstand.

Still using the foregoing scenario as an example, as light increases, the output voltage of the first photovoltaic string reaches 770 V, and the output voltage of the second string of battery panels also reaches 770 V. In this case, the two photovoltaic strings do not need to be connected in series, and therefore the controller controls the second switch to be turned off and the first switch to be turned on. In addition, neither the first DC-to-DC module nor the second DC-to-DC module needs to operate, the output voltage of the first photovoltaic string may be directly transmitted to the busbar through the first on/off control device, and the output voltage of the second photovoltaic string may be directly transmitted to the busbar through the second on/off control device.

Actually, the first on/off control device and the second on/off control device in the examples corresponding to FIG. 9 and FIG. 10 may be diodes or switches, which are described in the following with FIG. 11 and FIG. 12, respectively.

Figure 11:
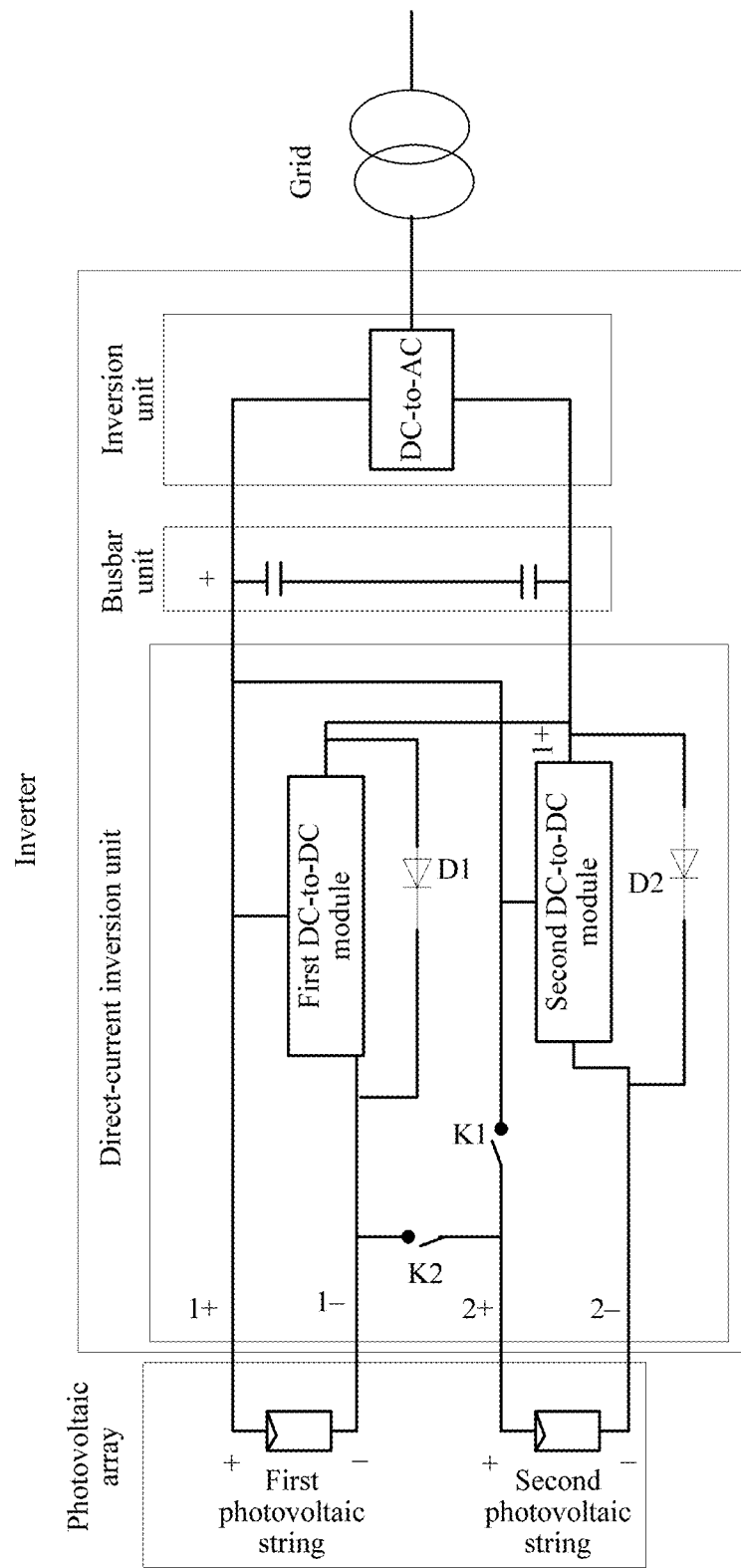
FIG. 11 is another schematic structural diagram of an inverter according to an embodiment of this application.

As shown in FIG. 11, in another embodiment of the inverter provided in the embodiments of this application, the first on/off control device may be a first diode D1, and the second on/off control device is a second diode D2. In this case, the other end of the first negative input terminal is connected to the first terminal of the first DC-to-DC module and a cathode of the first diode D1, and the third terminal of the first DC-to-DC module is connected to the negative electrode of the busbar unit and the anode of the first diode D1; the other end of the second negative input terminal is connected to the first terminal of the second DC-to-DC module and a cathode of the second diode D2, and the third terminal of the second DC-to-DC module is connected to the negative electrode of the busbar unit and an anode of the second diode D2.

Figure 12:
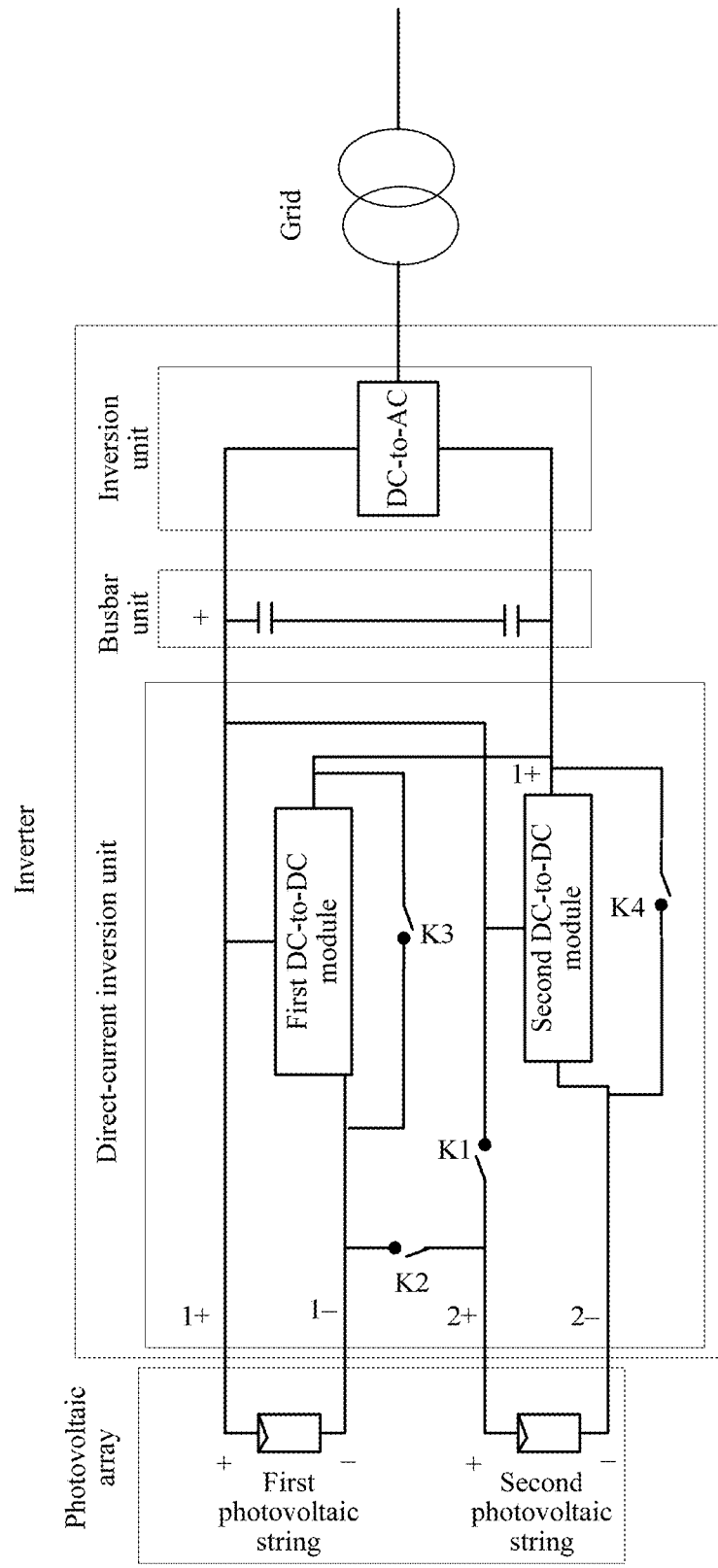
FIG. 12 is another schematic structural diagram of an inverter according to an embodiment of this application.

As shown in FIG. 12, in another embodiment of the inverter provided in the embodiments of this application, the first on/off control device may be a third switch K3, and the second on/off control device is a fourth switch K4. In this case, the other end of the first negative input terminal is connected to the first terminal of the first DC-to-DC module and one terminal of the third switch K3, the other end of the first negative input terminal is further connected to the second positive input terminal through the second switch, the other end of the first positive input terminal is connected to the second terminal of the first DC-to-DC module and the positive electrode of the busbar unit, and the third terminal of the first DC-to-DC module is connected to the negative electrode of the busbar unit and the other terminal of the third switch K3; and the other end of the second negative input terminal is connected to the first terminal of the second DC-to-DC module and one terminal of the fourth switch K4, the other end of the second positive input terminal is connected to the second terminal of the second DC-to-DC module and the positive electrode of the busbar unit through the first switch, and the third terminal of the second DC-to-DC module is connected to the negative electrode of the busbar unit and the other terminal of the fourth switch K4.

Actually, the first DC-to-DC module and the second DC-to-DC module each may be implemented in the form of a circuit. As shown in FIG. 5, in another embodiment of the inverter provided in the embodiments of this application, the first DC-to-DC module and the second DC-to-DC module each are implemented by a circuit in which an inductor and a capacitor are connected in series, then connected to a transistor in parallel, and then connected to a diode. In the example of the structure shown in FIG. 13, the first on/off control device is the first diode, and the second on/off control device is the second diode. The circuit structures of the first DC-to-DC module and the second DC-to-DC module are not limited, provided that the function of raising voltage can be implemented.

Figure 13:
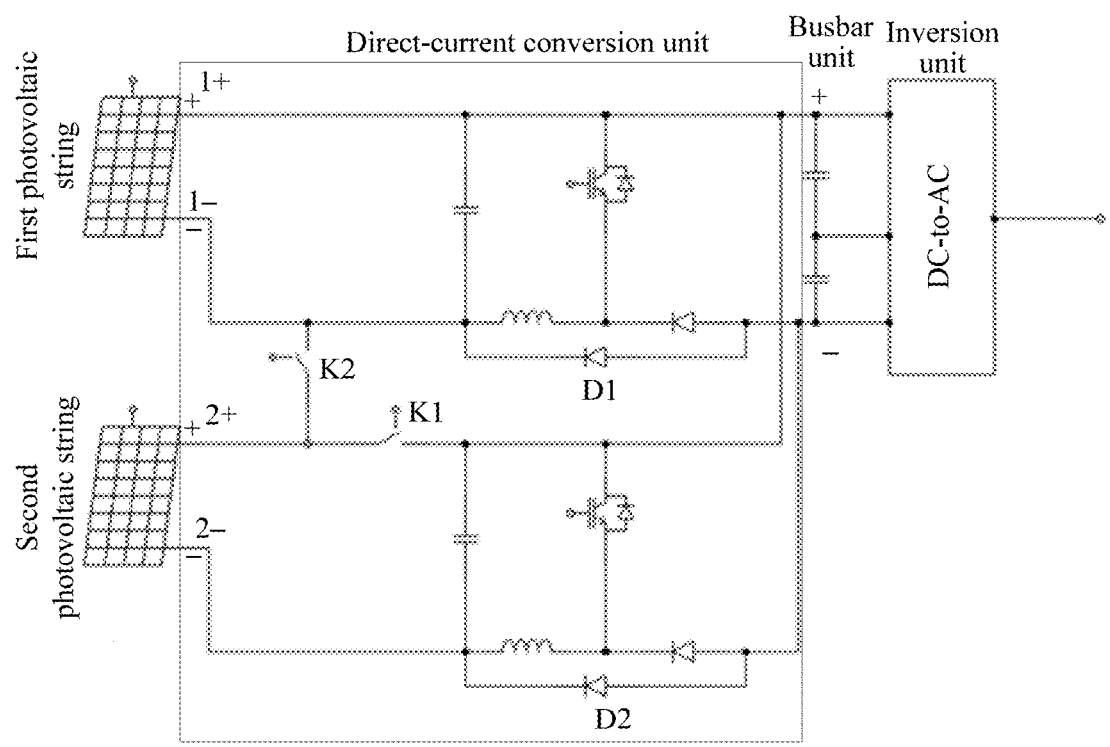
FIG. 13 is another schematic structural diagram of an inverter according to an embodiment of this application.
Figure 14:
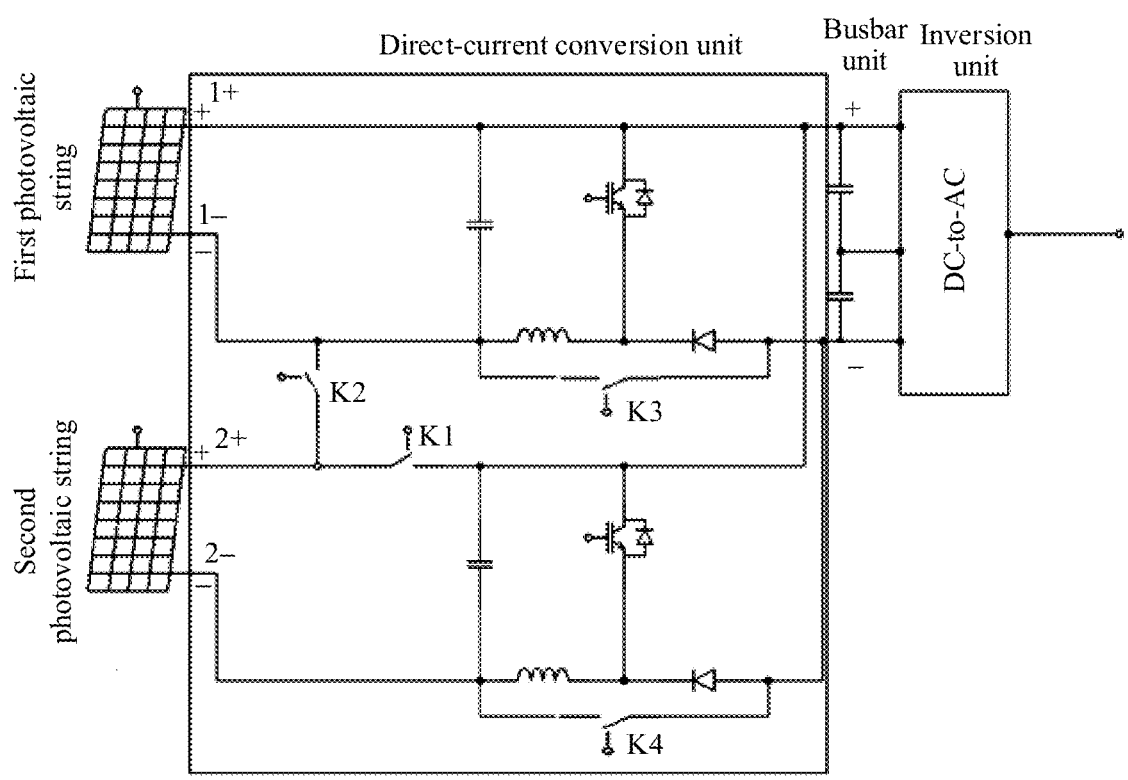
FIG. 14 is another schematic structural diagram of an inverter according to an embodiment of this application.

As shown in FIG. 14, in another embodiment of the inverter provided in the embodiments of this application, the circuits of the first DC-to-DC module and the second DC-to-DC module are the same as the circuits shown in FIG. 13, except that the first on/off control device is the third switch, and the second on/off control device is the fourth switch.

Figure 15:
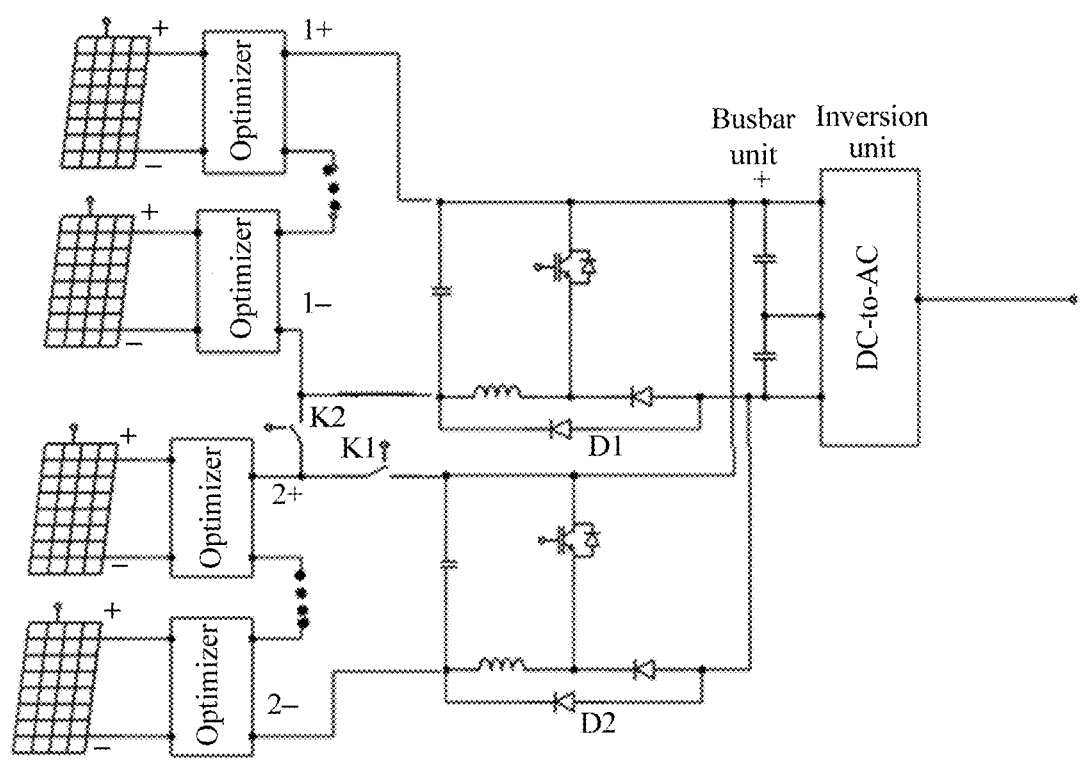
FIG. 15 is another schematic structural diagram of an inverter according to an embodiment of this application.

In all the foregoing solutions, only the first photovoltaic string and the second photovoltaic string are described. Actually, one inverter may be connected to a plurality of photovoltaic strings, and these photovoltaic strings may also be connected to the inverter through optimizers. FIG. 15 shows a scenario in which a plurality of photovoltaic strings is connected to the inverter through optimizers. In this scenario, the first on/off control device is the first diode, and the second on/off control device is the second diode.

Figure 16:
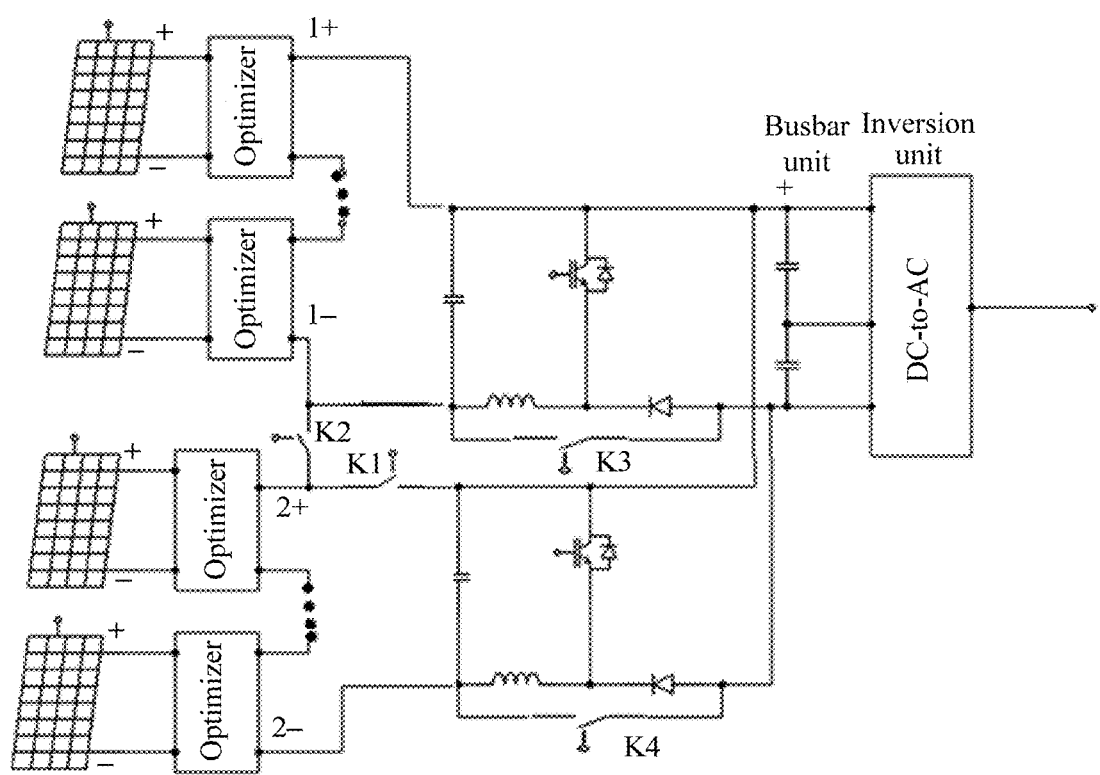
FIG. 16 is another schematic structural diagram of an inverter according to an embodiment of this application.

As shown in FIG. 16, in another embodiment of the inverter provided in the embodiments of this application, the scenario in which a plurality of photovoltaic strings is connected to the inverter through optimizers is basically the same as the situation shown in FIG. 15, except that the first on/off control device is the third switch, and the second on/off control device is the fourth switch.

The inverter provided in the embodiments of this application is described in detail above. The principle and implementation of this application are described herein through specific examples in the specification. The description about the embodiments of this application is merely provided to help understand the method and core ideas of this application. In addition, a person of ordinary skill in the art can make variations and modifications to this application in terms of the specific embodiments and application scopes according to the ideas of this application. Therefore, the content of specification shall not be construed as a limitation to this application.

What is claimed is:

1. An inverter, comprising:
a busbar unit;
an inversion unit having an input terminal connected to the busbar unit, wherein the inversion unit is configured to convert a direct-current (DC) voltage between a positive electrode and a negative electrode of the busbar unit into an alternating current (AC) voltage;
a DC conversion unit having a first positive input terminal, a first negative input terminal, a second positive input terminal, a second negative input terminal, a first DC-to-DC module, a second DC-to-DC module, a first on/off control device, a second on/off control device, a first switch, and a second switch, wherein
the first positive input terminal is connected to a first terminal of the first DC-to-DC module and one terminal of the first on/off control device, the first negative input terminal is connected to a second terminal of the first DC-to-DC module and the negative electrode of the busbar unit through the first switch, the first negative input terminal is connected to the second positive input terminal through the second switch, and a third terminal of the first DC-to-DC module is connected to another terminal of the first on/off control device and the positive electrode of the busbar unit;
the second positive input terminal is connected to a first terminal of the second DC-to-DC module and one terminal of the second on/off control device, the second negative input terminal is connected to a second terminal of the second DC-to-DC module and the negative electrode of the busbar unit, and a third terminal of the second DC-to-DC module is connected to another terminal of the second on/off control device and the positive electrode of the busbar unit; and
a controller configured to perform detection on an operating state of the inversion unit, and, when the inversion unit is in the operating state, perform detection on output voltage of a first photovoltaic string and output voltage of a second photovoltaic string, and when detecting that the inversion unit is not operating, control the second switch to be turned off.

2. The inverter according to claim 1, wherein the first on/off control device is a first diode and the second on/off control device is a second diode,
one side of the first positive input terminal is connected to the first terminal of the first DC-to-DC module and an anode of the first diode, and the third terminal of the first DC-to-DC module is connected to a cathode of the first diode and the positive electrode of the busbar unit; and
one side of the second positive input terminal is connected to the first terminal of the second DC-to-DC module and an anode of the second diode, and the third terminal of the second DC-to-DC module is connected to a cathode of the second diode and the positive electrode of the busbar unit.

3. The inverter according to claim 1, wherein
the controller is further configured to: when detecting that the inversion unit is not operating, control the first switch to be turned off or turned on.

4. The inverter according to claim 1, wherein
the controller is further configured to: when a sum of the output voltage of the first photovoltaic string and the output voltage of the second photovoltaic string is less than a first threshold, control the first switch to be turned off, the second switch to be turned on, the first DC-to-DC module to operate, and the second DC-to-DC module not to operate, wherein the first threshold is greater than or equal to voltage required by the busbar unit when the inversion unit is connected to a grid.

5. The inverter according to claim 1, wherein
the controller is further configured to: when a sum of the output voltage of the first photovoltaic string and the output voltage of the second photovoltaic string is greater than or equal to a first threshold and less than a second threshold, control the first switch to be turned off, the second switch to be turned on, and the first DC-to-DC module and the second DC-to-DC module not to operate, and energy input to the inverter is directly input to the busbar unit through the second switch and a first diode.

6. The inverter according to claim 1, wherein
the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second DC-to-DC module to operate, wherein the third threshold is greater than or equal to a first threshold and less than the second threshold.

7. The inverter according to claim 1, wherein
the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally.

8. The inverter according to claim 1, wherein
the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate.

9. The inverter according to claim 1, wherein
the controller is further configured to: when a sum of the output voltage of the first photovoltaic string and the output voltage of the second photovoltaic string is greater than a second threshold, and the output voltage of the first photovoltaic string is greater than a fourth threshold, or the output voltage of the second photovoltaic string is greater than the fourth threshold, control the inversion unit not to operate, and report an alarm, wherein the fourth threshold is a maximum output value of the inverter.

10. An inverter, comprising:
a busbar unit;
an inversion unit having an input terminal connected to the busbar unit, wherein the inversion unit is configured to convert direct-current (DC) voltage between a positive electrode and a negative electrode of the busbar unit into an alternating current (AC) voltage; and
a DC conversion unit having a first positive input terminal, a first negative input terminal, a second positive input terminal, a second negative input terminal, a first direct current DC-to-DC module, a second DC-to-DC module, a first on/off control device, a second on/off control device, a first switch, and a second switch, wherein
the first negative input terminal is connected to a first terminal of the first DC-to-DC module and one terminal of the first on/off control device, the first negative input terminal is further connected to the second positive input terminal through the second switch, an other end of the first positive input terminal is connected to a second terminal of the first DC-to-DC module and the positive electrode of the busbar unit, and a third terminal of the first DC-to-DC module is connected to the negative electrode of the busbar unit and another terminal of the first on/off control device;
the second negative input terminal is connected to a first terminal of the second DC-to-DC module and one terminal of the second on/off control device, the second positive input terminal is connected to a second terminal of the second DC-to-DC module and the positive electrode of the busbar unit through the first switch, and a third terminal of the second DC-to-DC module is connected to a negative electrode of the busbar unit and another terminal of the second on/off control device.

11. The inverter according to claim 10, wherein the first on/off control device is a first diode and the second on/off control device is a second diode,
the other end of the first negative input terminal is connected to the first terminal of the first DC-to-DC module and a cathode of the first diode, and the third terminal of the first DC-to-DC module is connected to the positive electrode of the busbar unit and an anode of the first diode; and
the other end of the second negative input terminal is connected to the first terminal of the second DC-to-DC module and a cathode of the second diode, and the third terminal of the second DC-to-DC module is connected to the negative electrode of the busbar unit and an anode of the second diode.

12. The inverter according to claim 10, further comprising a controller configured to:
perform detection on an operating state of the inversion unit, and
when the inversion unit is in the operating state, perform detection on an output voltage of a first photovoltaic string and an output voltage of a second photovoltaic string.

13. The inverter according to claim 12, wherein
the controller is further configured to: when detecting that the inversion unit is not operating, control the second switch to be turned off and control the first switch to be turned off or turned on.

14. The inverter according to claim 12, wherein
the controller is further configured to: when a sum of the output voltage of the first photovoltaic string and the output voltage of the second photovoltaic string is less than a first threshold, control the first switch to be turned off, the second switch to be turned on, the first DC-to-DC module not to operate, and the second DC-to-DC module to operate, wherein the first threshold is greater than or equal to voltage required by the busbar unit when the inversion unit is connected to a grid.

15. The inverter according to claim 12, wherein
the controller is further configured to: when a sum of the output voltage of the first photovoltaic string and the output voltage of the second photovoltaic string is greater than or equal to a first threshold and less than a second threshold, control the first switch to be turned off, the second switch to be turned on, and the first DC-to-DC module and the second DC-to-DC module not to operate, and energy input to the inverter is directly input to the busbar unit through the second switch and a first diode.

16. The inverter according to claim 12, wherein
the controller is further configured to: when a sum of the output voltage of the first photovoltaic string and the output voltage of the second photovoltaic string is greater than or equal to a second threshold, the output voltage of the first photovoltaic string is less than a third threshold, and the output voltage of the second photovoltaic string is less than the third threshold, control the first switch to be turned on, the second switch to be turned off, and the first DC-to-DC module and the second DC-to-DC module to operate, wherein the third threshold is greater than or equal to a first threshold and less than the second threshold.

17. The inverter according to claim 12, wherein
the controller is further configured to: when a sum of the output voltage of the first photovoltaic string and the output voltage of the second photovoltaic string is greater than a second threshold, the output voltage of the first photovoltaic string is greater than a third threshold, and the output voltage of the second photovoltaic string is less than the third threshold, control the first switch to be turned on, the second switch to be turned off, the first DC-to-DC module not to operate, and the second DC-to-DC module to operate normally.

18. The inverter according to claim 12, wherein
the controller is further configured to: when a sum of the output voltage of the first photovoltaic string and the output voltage of the second photovoltaic string is greater than a second threshold, the output voltage of the first photovoltaic string is less than a third threshold, and the output voltage of the second photovoltaic string is greater than the third threshold, control the first switch to be turned on, the second switch to be turned off, the first DC-to-DC module to operate, and the second DC-to-DC module not to operate.

19. The inverter according to claim 12, wherein
the controller is further configured to: when a sum of the output voltage of the first photovoltaic string and the output voltage of the second photovoltaic string is greater than a second threshold, and the output voltage of the first photovoltaic string is greater than a fourth threshold, or the output voltage of the second photovoltaic string is greater than the fourth threshold, control the inversion unit not to operate, and report an alarm, wherein the fourth threshold is a maximum output value of the inverter.

* * * * *